United States Patent
Morita et al.

(10) Patent No.: US 11,982,324 B2
(45) Date of Patent: May 14, 2024

(54) CAM CLUTCH UNIT

(71) Applicant: TSUBAKIMOTO CHAIN CO., Osaka (JP)

(72) Inventors: Akira Morita, Osaka (JP); Hirokazu Tsuneda, Osaka (JP); Yuji Kurematsu, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/222,163

(22) Filed: Jul. 14, 2023

(65) Prior Publication Data
US 2024/0102520 A1  Mar. 28, 2024

(30) Foreign Application Priority Data
Sep. 22, 2022 (JP) .................. 2022-151721

(51) Int. Cl.
  *F16D 41/067* (2006.01)
  *F16C 41/00* (2006.01)
  *F16D 41/07* (2006.01)
(52) U.S. Cl.
  CPC .......... *F16D 41/067* (2013.01); *F16C 41/001* (2013.01); *F16D 41/07* (2013.01)
(58) Field of Classification Search
  CPC ....... F16D 41/067; F16D 41/07; F16C 41/001
  See application file for complete search history.

(56) References Cited

U.S. PATENT DOCUMENTS

| | | | | |
|---|---|---|---|---|
| 5,064,037 A | * | 11/1991 | Long, Jr. ................ | F16D 41/07 192/104 B |
| 6,119,838 A | * | 9/2000 | Igari .................... | F16C 41/001 192/41 A |
| 11,767,891 B2 | * | 9/2023 | Fukuda ................ | F16D 41/067 192/45.006 |
| 2005/0067248 A1 | | 3/2005 | Takasu | |

FOREIGN PATENT DOCUMENTS

JP  2005-106135 A  4/2005

* cited by examiner

*Primary Examiner* — Richard M Lorence
(74) *Attorney, Agent, or Firm* — WHDA, LLP (57) ABSTRACT

To provide a cam clutch unit that is easy to handle before assembly, with its components prevented from lifting or detachment, and that allows production with fewer machining steps and a lower level of difficulty, while also enabling unit thickness reduction. The cam clutch unit of the present invention includes: a plurality of cams arranged between an inner race and an outer race; a cage ring having a plurality of pocket portions that restrict relative circumferential movements of the cams; and an annular spring that biases the cams. The cams have an engagement step adapted to engage with the spring on one axial end face. The cage ring has a plurality of hook portions that restrict an axial movement of the annular spring. The hook portions have a pressing part that allows the spring to press the cams towards the other axial end.

5 Claims, 12 Drawing Sheets

CAM CLUTCH UNIT

BACKGROUND OF THE INVENTION

1. Field of the Invention

The present invention relates to a cam clutch unit that transmits and interrupts torque between an input shaft and an output shaft.

2. Description of the Related Art

A known cam clutch unit includes a plurality of cams and rollers arranged between an inner race and an outer race that are coaxial and rotatable relative to each other. A cage ring with a plurality of pocket portions restrict relative circumferential movements of the cams and the rollers. An annular spring biases the cams.

For example, the cam clutch unit 500 shown in FIG. 17 to FIG. 21 has a plurality of cams 530 and a plurality of rollers 540 circumferentially arranged between the inner race and outer race that are coaxial and rotatable relative to each other. The cams 530 and rollers 540 are accommodated in the pocket portions 551 and 552 of the cage ring 550, so that the cams 530 and rollers 540 are restricted from moving in the circumferential direction relative to each other.

The cams 530 and rollers 540 have circumferential grooves 535 and 545, respectively. An annular spring 560 is accommodated in the grooves 535 and 545 to bias the cams 530 and rollers 540 towards the inner race.

SUMMARY OF THE INVENTION

In the known cam clutch unit, the cams 530 and rollers 540, which are required to be highly resistant to wear and impact, have circumferential grooves 535 and 545 in their center part for accommodating the annular spring 560. This led to the problem that the production of the cams 530 and rollers 540 needed an increased number of machining steps and an advanced level of machining. The grooves posed a limitation on the machining, i.e., the cams and rollers could not be made thinner beyond a certain width limit.

In another known cam clutch unit, the cams and rollers are provided with portions for receiving a force from a spring on both axial ends, as shown for example in Japanese Patent Application Publication No. 2005-106135. However, these cams require a lock mechanism for preventing axial detachment of the spring. Therefore, while the machining of these cams and rollers is less difficult, the process still needs just as many machining steps.

Figure 22A:
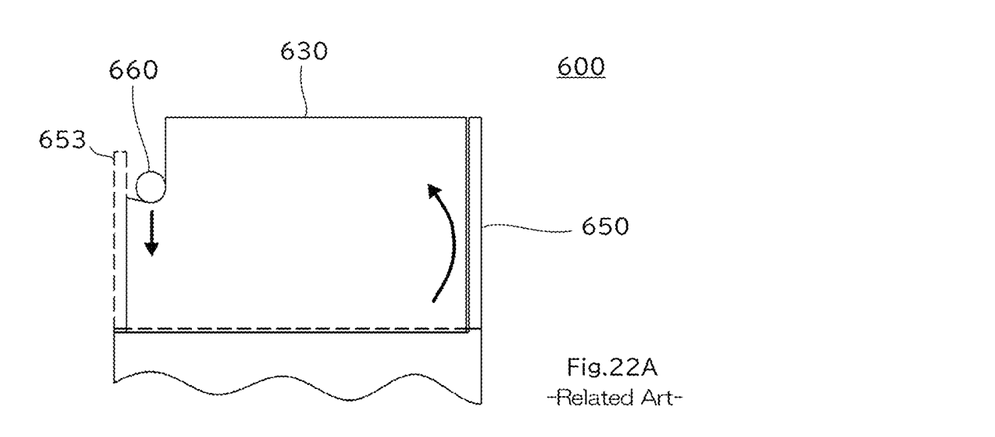
FIG. 22A is a schematic enlarged partial cross-sectional view illustrating one example of a cam clutch unit before the cam is biased radially inwards.

One conceivable means of addressing the above problems is to form an engagement step on one axial end face of the cams 630, for example as shown in FIG. 22A. This step is to engage with an annular spring 660 that biases the cams 630 radially inwards. Hook portions 653 may be provided on the radially outer side of the cage ring 650 to restrict the axial movement of the spring 660.

Figure 22B:
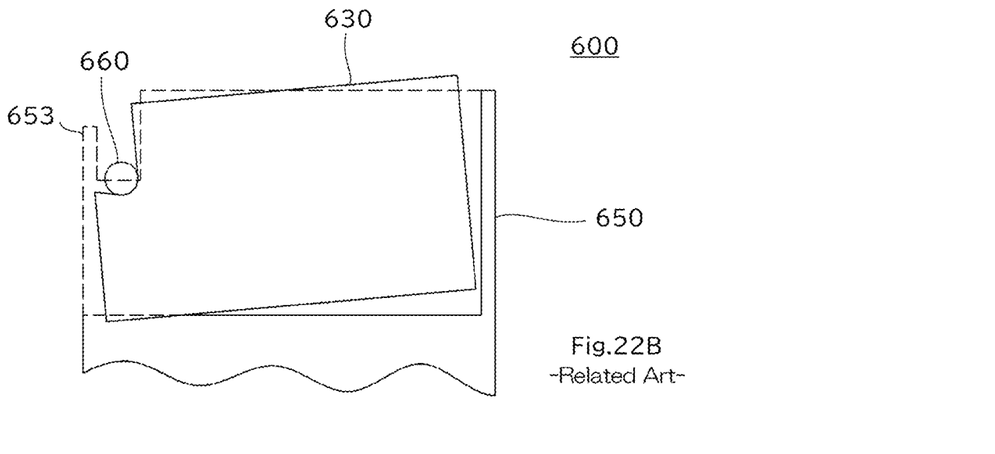
FIG. 22B is a schematic enlarged partial cross-sectional view illustrating one example of the cam clutch unit after the cam is biased radially inwards.

In the cam clutch unit 600 with such a design, as illustrated in FIG. 22B, the cams 630 would be pressed radially inwards (downwards in FIG. 22B), creating a moment on the cams 630. As a result, the cams 630 may tilt, or lift radially outwards, potentially causing them to detach easily from the cage ring 650 during transportation of the cam clutch unit 600 prior to assembly. This approach may consequently lead to another issue of handling difficulties during assembly of the cam clutch unit 600.

To prevent the detachment of cams in the cam clutch unit before assembly, it is possible to apply an axial force that presses down the cams. This can be achieved by adjusting the position of the spring set on the engagement steps relative to the cage ring. However, this approach would make the assembly of the spring itself more difficult. Moreover, the increased sliding resistance of the cams during the intended operation of the cam clutch after the cam clutch unit has been assembled could negatively impact wear durability and result in unfavorable drag torque properties.

It is an object of the present invention to solve the above problems and to provide a cam clutch unit that is easy to handle before assembly, with its components prevented from lifting or detachment, and that allows production with fewer machining steps and a lower level of difficulty, while also enabling unit thickness reduction.

The present invention solves the above problems by providing a cam clutch unit including: a plurality of cams and a plurality of rollers arranged between an inner race and an outer race that are coaxial and rotatable relative to each other; a cage ring having a plurality of pocket portions that restrict relative circumferential movements of the cams and the rollers; and an annular spring that biases the cams, the cams having an engagement step adapted to engage with the spring on one axial end face, the cage ring having a plurality of hook portions that restrict an axial movement of the annular spring, the hook portions having a pressing part that allows the spring to press the cams towards an other axial end.

According to the cam clutch unit of the present invention, the hook portions have a pressing part that allows the spring to press the cams towards the other axial end, so that the cams, pressed by the spring towards the other axial end, come into contact with the cage ring. This design ensures that components of the cam clutch unit, such as the cams, are prevented from lifting or detachment before assembly, enhancing the ease of handling of the cam clutch unit during the pre-assembly stage.

The cams have an engagement step adapted to engage with the spring on one axial end face, which simplifies the overall structure, reduces the number of required machining steps, lowers the level of difficulty of production, and enables unit thickness reduction. The cage ring has a plurality of hook portions that restrict an axial movement of the annular spring. There is no need to machine the engagement step on the end face of the cams in a shape that restricts an axial movement of the spring. As a result, the number of machining steps is reduced, and the overall level of difficulty is lowered.

According to the present invention, the hook portions are formed with a taper surface inclined towards the cams. In the cam clutch unit before assembly, the absence of the inner race and any component that restricts the rotation of the cams about themselves causes the cams to shift radially inwards. This shift allows the spring to move independently into the bottom of the tapered groove space, which is formed between the taper surface of the hook portions and the cams, where the axial width is small. As a result, the cams are pressed towards the other axial end, and this in turn ensures that the components of the cam clutch unit such as the cams are reliably prevented from lifting or detachment.

On the other hand, once the cam clutch unit is assembled into a cam clutch, the cams undergo a radial outward shift to reach their intended position. This shift occurs due to the difference in the drop amount of the cams between the pre-assembly and post-assembly stages of the cam clutch unit. As a result, the spring autonomously moves to the upper part of the tapered groove space. As a consequence, the spring stops applying pressure on the cams towards the other axial end and comes out of contact with the cage ring. This in turn prevents the generation of sliding resistance between one axial end face of the cams and the spring, as well as sliding resistance between the other axial end face of the cams and the cage ring. This outcome results in excellent wear durability, and helps prevent deterioration of drag torque properties.

The tapered groove space is variable in radial width and axial width. In the design process, consideration is given to the diameter of the spring so that when the cams and cage ring form the tapered groove space, there is a sufficient maximum distance between them to accommodate the spring. This design approach ensures that there is a sufficient gap between the cage ring and the cams in the pocket portions, which allows easier assembly of the cam clutch unit.

The spring exerts a consistent pressure on the cams, even in cases where the components may have a slightly lower level of dimensional accuracy. This characteristic is beneficial as it helps to increase the yield of the cam clutch unit and improves overall productivity.

According to the present invention, the hook portions may be formed with a step part that protrudes towards the cams. In the cam clutch unit before assembly, the absence of the inner race and any component that restricts the rotation of the cams about themselves causes the cams to shift (drop) radially inwards. This shift allows the spring to move independently into the bottom of the stepped groove space, which is formed between the step part of the hook portions and the cams, where the axial width is small. As a result, the cams are pressed towards the other axial end, and this in turn ensures that the components of the cam clutch unit such as the cams are reliably prevented from lifting or detachment.

On the other hand, once the cam clutch unit is assembled into a cam clutch, the cams undergo a radial outward shift to reach their intended position. This shift occurs due to the difference in the drop amount of the cams between the pre-assembly and post-assembly stages of the cam clutch unit. As a result, the spring autonomously moves to the wider upper step of the stepped groove space. As a consequence, the spring stops applying pressure on the cams towards the other axial end and comes out of contact with the cage ring. This in turn prevents the generation of sliding resistance between one axial end face of the cams and the spring, as well as sliding resistance between the other axial end face of the cams and the cage ring. This outcome results in excellent wear durability, and helps prevent deterioration of drag torque properties.

The stepped groove space is variable in radial width and axial width. In the design process, consideration is given to the diameter of the spring so that when the cams and cage ring form the stepped groove space, there is a sufficient maximum distance between them to accommodate the spring. This design approach ensures that there is a sufficient gap between the cage ring and the cams in the pocket portions, which allows easier assembly of the cam clutch unit.

The spring exerts a consistent pressure on the cams, even in cases where the components may have a slightly lower level of dimensional accuracy. This characteristic is beneficial as it helps to increase the yield of the cam clutch unit and improves overall productivity.

According to the present invention, the cams have a restriction step on the end face opposite to the engagement step, while the pocket portions of the cage ring have restriction protrusions. The restriction steps on the cams engage with the restriction protrusions of the cage ring, and prevent the cams from tilting relative to the axial direction, even when pressure is applied to them from the spring in the axial direction. This design ensures that the components of the cam clutch unit such as the cams are reliably prevented from lifting or detachment before assembly.

As compared to a case where the prevention of lifting or detachment of cams relies solely on a spring applying pressure in the axial direction, the present invention allows for the design of a spring that exerts less pressure on the cams in the cam clutch unit before assembly. Once the cam clutch unit is assembled, the spring exerts less force on the cams. This design ensures that there is no sliding resistance between one axial end face of the cams and the spring, as well as between the other axial end face of the cams and the cage ring.

The clearance between the other axial end face of the cams and the cage ring may be reduced to lower the protruding height in the axial direction of the restriction steps. The assemblability of the cam clutch unit can further be improved if the cams are designed to have an overall axial width that is smaller than the axial width of the pocket portions.

According to the present invention, rollers are disposed between the inner race and the outer race, and their axial length is equal to or shorter than the axial length of the cams, excluding the engagement steps. As a result, the rollers are restricted only in the axial direction and can rotate freely. There is hardly any frictional sliding between the cams and the spring, leading to reduced rotation resistance of the rollers.

DESCRIPTION OF THE PREFERRED EMBODIMENTS

The cam clutch unit according to the present invention includes: a plurality of cams arranged between an inner race and an outer race that are coaxial and rotatable relative to each other; a cage ring having a plurality of pocket portions that restrict relative circumferential movements of the cams; and an annular spring that biases the cams. The cams each have an engagement step adapted to engage with the spring on one axial end face. The cage ring has a plurality of hook portions that restrict an axial movement of the annular spring. The hook portions have a pressing part that allows the spring to press the cams towards an other axial end. This basically simple structure reduces the number of machining steps and the overall level of difficulty of production, and enables unit thickness reduction. There is no need to machine the engagement step on the end face of the cams in a shape that restricts the axial movement of the spring. As a result, the number of machining steps is reduced, and the overall level of difficulty is lowered. The components of the cam clutch unit before assembly such as the cams are prevented from detachment, and thus the cam clutch unit offers good handling ease before assembly. The configuration of the present invention may take any form as long as it provides a cam clutch unit with the above features and advantages.

Embodiment 1

As shown in FIG. 1 to FIG. 9B, the cam clutch unit 100 according to one embodiment of the present invention includes: a plurality of cams 130 provided as sprags for transmitting and interrupting torque between an inner race and an outer race, in an annular space between raceways of the inner race and outer race that are coaxial and rotatable relative to each other; a plurality of rollers 140 allowing the inner race and outer race to freely rotate; a cage ring 150 having a plurality of pocket portions 151 and 152 that restrict circumferential movements of the cams 130 and rollers 140 relative to each other, and an annular spring 160 biasing each of the plurality of cams 130 towards a direction in which the cams wedge against the inner race and outer race.

Figure 1:
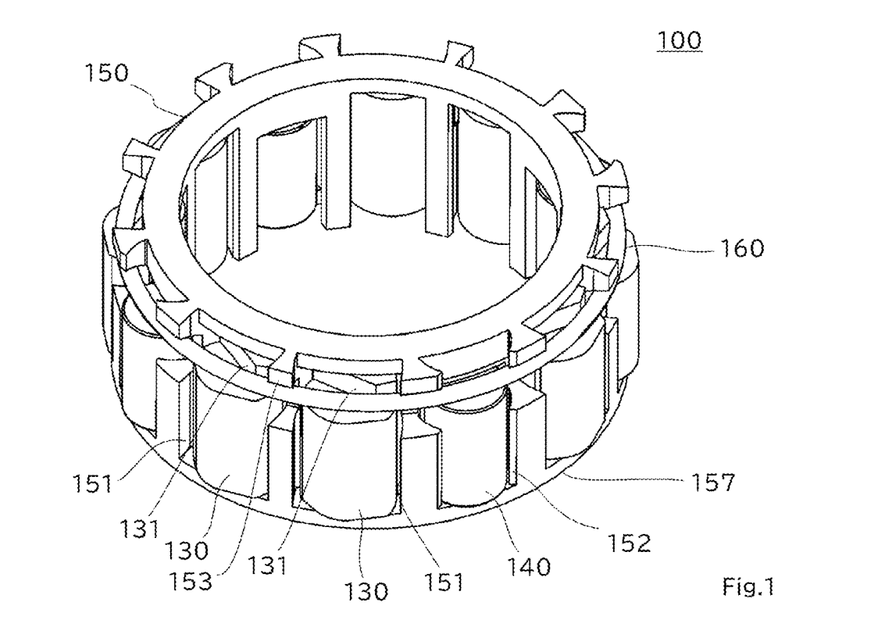
FIG. 1 is a perspective view of a cam clutch unit according to one embodiment of the present invention.
Figure 2:
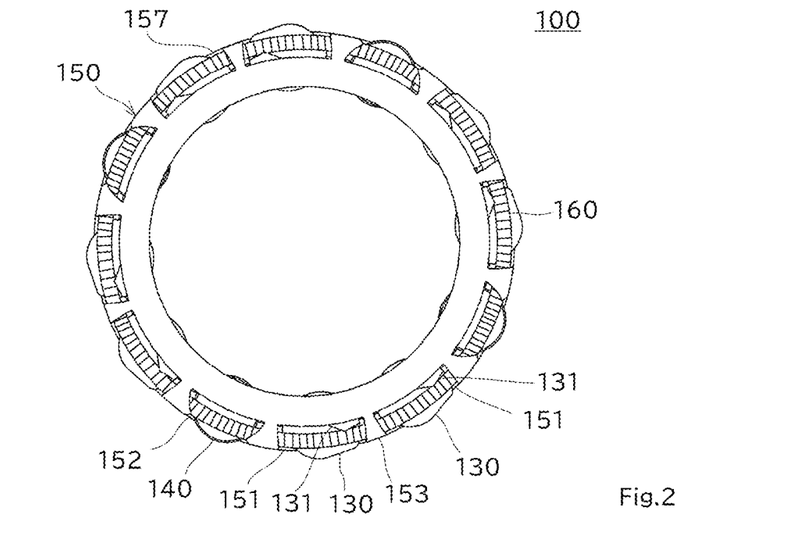
FIG. 2 is a front view of the cam clutch unit shown in FIG. 1 as viewed from the direction of the rotation axis.
Figure 3:
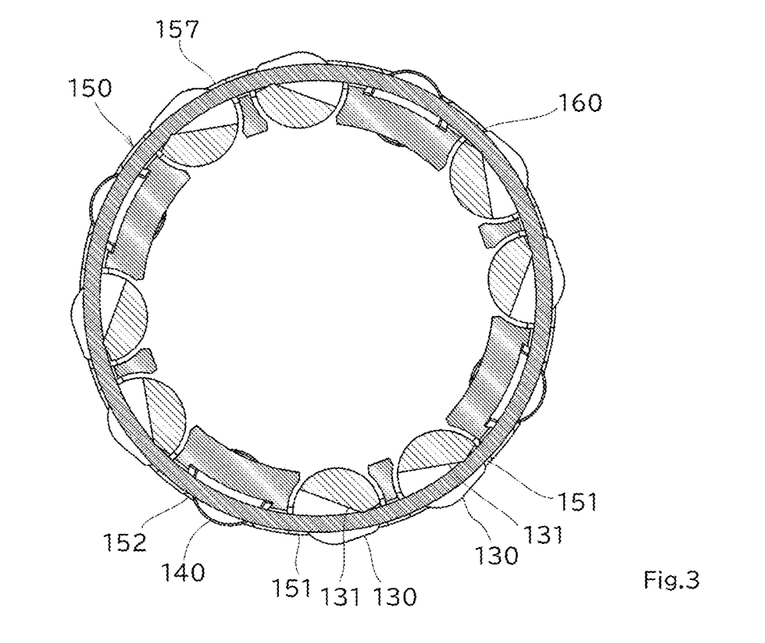
FIG. 3 is a cross-sectional view of a horizontal plane across the rotation axis of the cam clutch unit shown in FIG. 1.
Figure 4A:
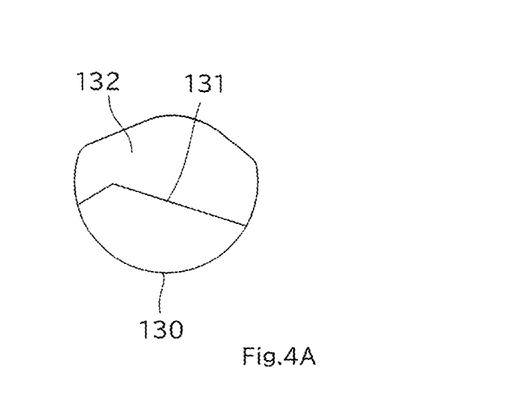
FIG. 4A is a front view of the cam in the cam clutch unit shown in FIG. 1.
Figure 4B:
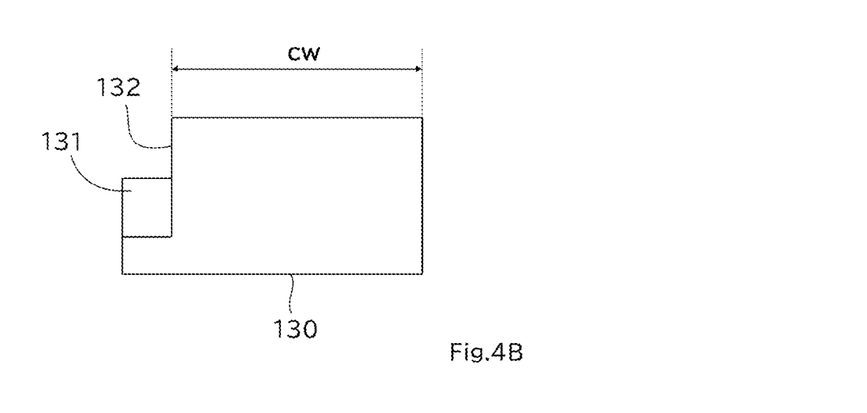
FIG. 4B is a side view of the cam in the cam clutch unit shown in FIG. 1.

Each of the plurality of cams 130 has an engagement step 131 adapted to engage with the annular spring 160 on one axial end face as shown in FIG. 4A and FIG. 4B.

In this embodiment, the engagement step 131 is inclined, the left side in the drawing being radially more outside when the cam 130 is in a free state. The spring 160 pressing the left side of the engagement step 131 biases the cam 130 towards the inner race, as well as causes the cam 130 to rotate in an operating direction.

Figure 5A:
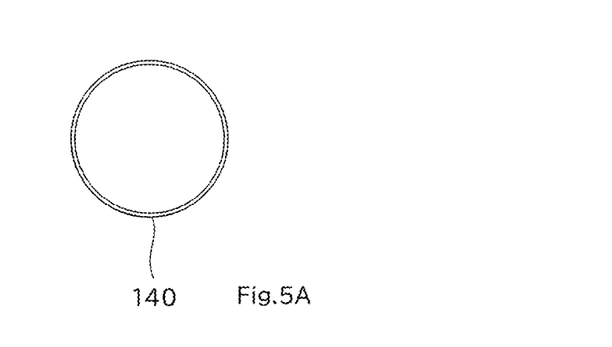
FIG. 5A is a front view of the roller in the cam clutch unit shown in FIG. 1.
Figure 5B:
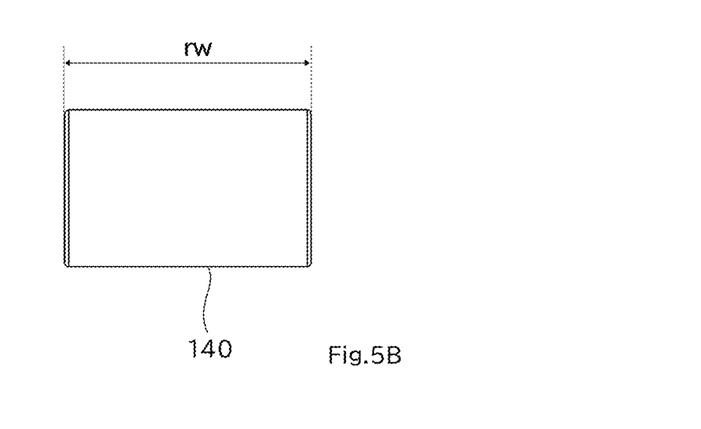
FIG. 5B is a side view of the roller in the cam clutch unit shown in FIG. 1.

The plurality of rollers 140 do not have any groove or step as shown in FIG. 5A and FIG. 5B. In this embodiment, the roller 140 has an axial length rw that is not greater than the axial length cw of the cam 130, excluding the engagement step 131.

In this embodiment, both end faces of the rollers 140 are chamfered along the outer peripheral edges to avoid catching the spring 160.

Figure 6:
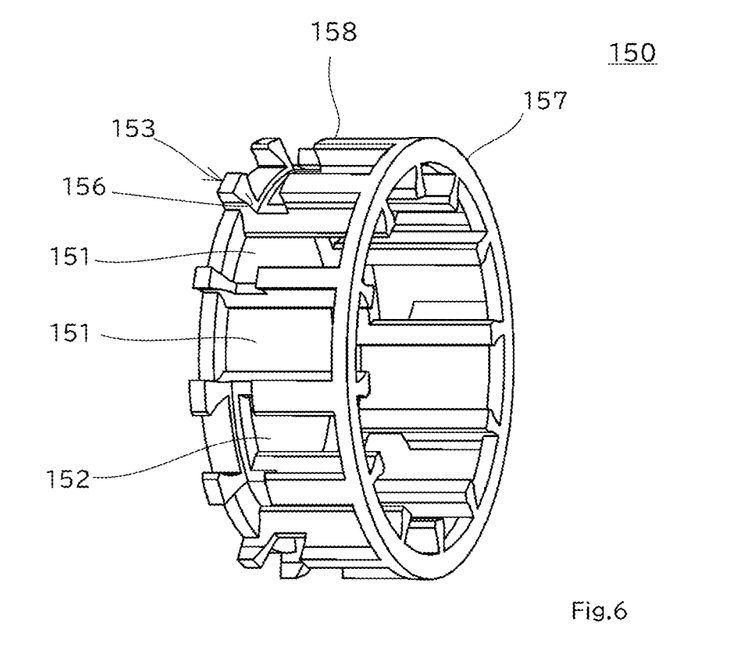
FIG. 6 is a perspective view of the cage ring in the cam clutch unit shown in FIG. 1.

As shown in FIG. 6, the cage ring 150 includes a plurality of pocket portions 151 and 152 that respectively accommodate and restrict relative circumferential movements of the cams 130 and the rollers 140, and a plurality of hook portions 153 that restrict the movement of the annular spring 160 towards one axial side. The cage ring 150 includes an annular support base 157 that connects the plurality of pocket portions 151 and 152 and restricts the movement of the cams 130 and rollers 140 towards the other axial side.

In this embodiment, the cage ring 150 has pocket portions 151 that accommodate the cams 130 and pocket portions 152 that accommodate the rollers 140. The pocket portions 151 for two adjacent cams 130 and the pocket portion 152 for one roller 140 are circumferentially alternately arranged. Namely, the pocket portions are arranged in a regular pattern in which every second pocket portion is the pocket portion 152 for the roller 140.

The pocket portions 151 and 152 each restrict the movements of the cams 130 and rollers 140 towards the other axial side by their other axial end faces, while the spring 160 restricts the movements of the cams and rollers towards one axial side.

Figure 7:
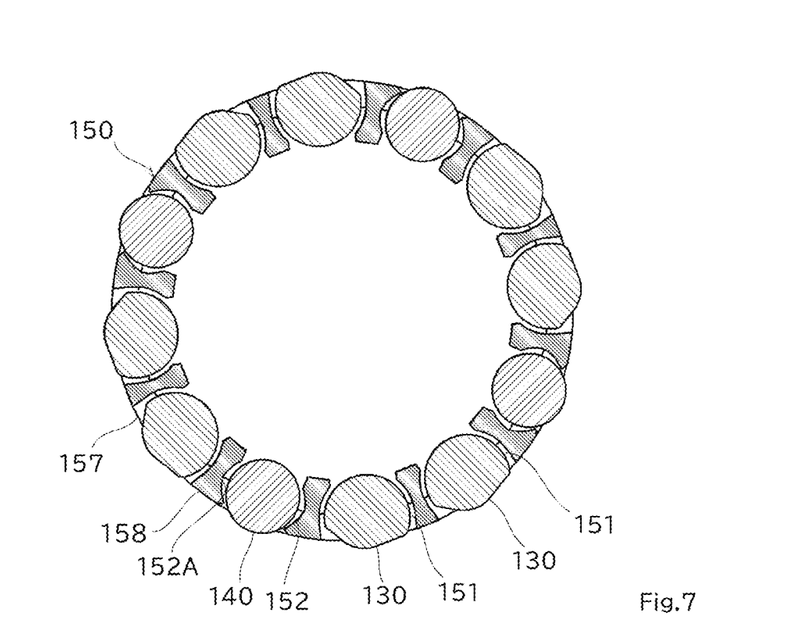
FIG. 7 is a cross-sectional view of a horizontal plane across the rotation axis of the cam clutch unit shown in FIG. 1.

In this embodiment, as shown in FIG. 7, the surface 152A facing the roller 140 (surface of the partition wall 158 to be described later facing the roller 140) conforms to the outer contour of the roller 140. Namely, the pocket portions 152 that accommodate the rollers 140 are shaped to restrict the movements of the rollers 140 towards the outer race and the inner race. This prevents radial outward detachment of the rollers 140 during the production process of the cam clutch.

The phrase "one axial side" used herein refers to one side of the cam clutch unit where the cam has the engagement step on the end face, and "the other axial side" refers to the opposite side.

In this embodiment, the cage ring 150 includes a plurality of hook portions 153 that restrict the axial movement of the annular spring 160 towards one axial side. The cage ring 150 has partition walls 158, each dividing two circumferentially adjacent pocket portions 151 and 152 respectively accommodating a cam 130 and a roller 140. Namely, the cage ring has a shape protruding radially outwards at one axial end.

The hook portion 153 is formed with a taper surface 156 inclined towards the cam 130 side, i.e., from the radially outer side to the inner side and from one axial side towards the other. The taper surfaces 156 opposite the cams 130 function as a pressing part that allows the spring 160 to press the cams 130 towards the other axial side.

Figure 8A:
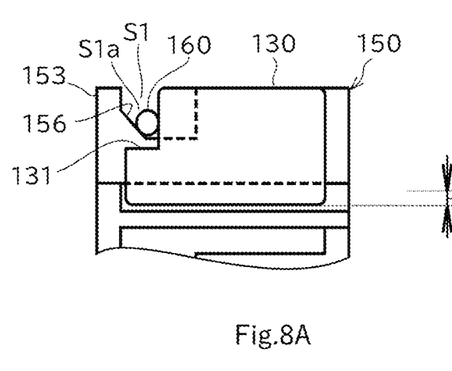
FIG. 8A is a partial cross-sectional view of the cam clutch unit shown in FIG. 1 before assembly.
Figure 8B:
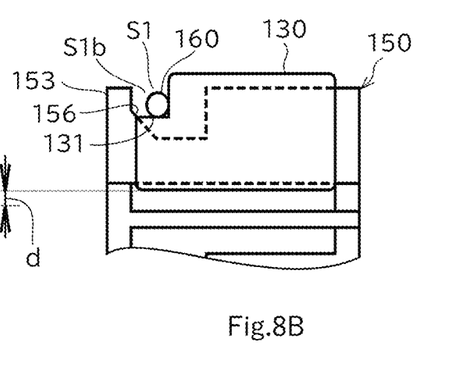
FIG. 8B is a partial cross-sectional view of the unit assembled to a cam clutch.
Figure 9A:
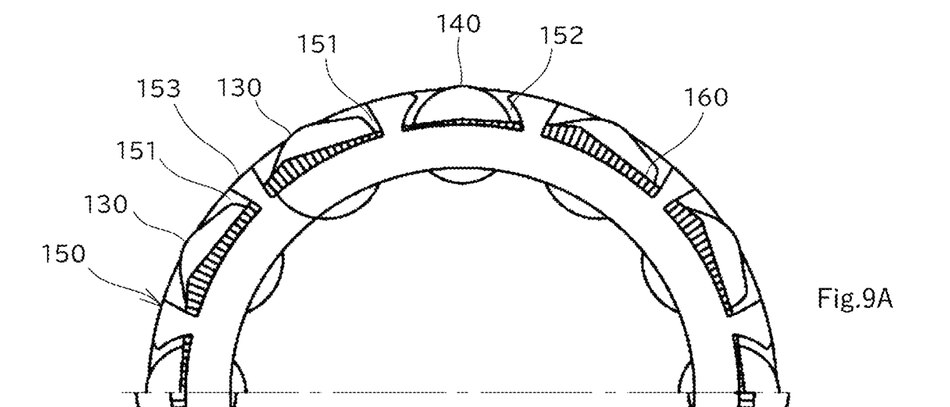
FIG. 9A is a partial front view of the cam clutch unit shown in FIG. 1 before assembly as viewed from the direction of the rotation axis.
Figure 9B:
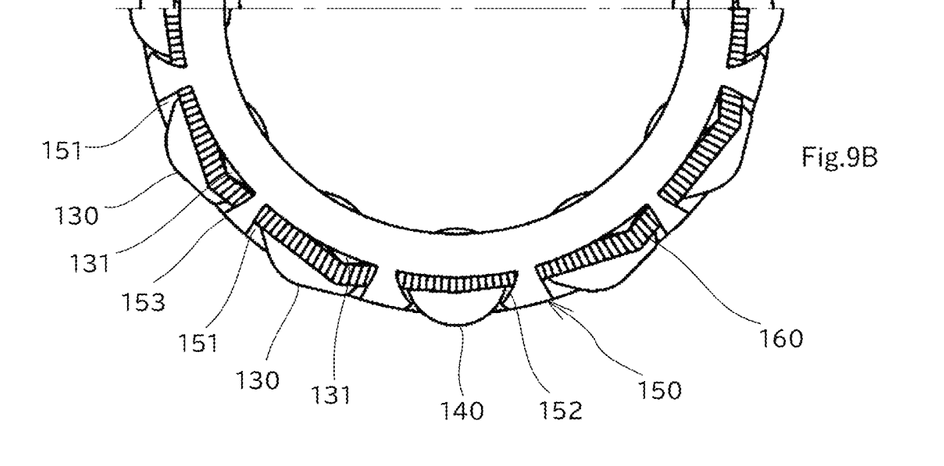
FIG. 9B is a partial front view of the unit assembled to a cam clutch.

To describe this feature in more detail, imaginary lines in the axial cross section of FIG. 8A show the taper surface 156 of the hook portion 153 overlapped with a cam 130. As shown, there is formed a tapered groove space S1 between them that reduces in axial width from one axial side (left side in FIG. 8A) towards the other side (right side in FIG. 8A). As shown in FIG. 8A and FIG. 9A, in the cam clutch unit 100 before assembly, the absence of the inner race and any component that restricts the rotation of the cams 130 about themselves causes the cams 130 to shift (drop) radially inwards, allowing the spring 160 to move independently into the bottom S1a of the tapered groove space S1 where the axial width is small. This movement causes the cams 130 to be pressed towards the other axial side (right side in FIG. 8A), and the end faces of the cams 130 on the other axial side come into contact with the support base 157 of the cage ring 150. Once the cam clutch unit 100 is assembled into a cam clutch, the cams 130 undergo a radial outward shift to reach their intended position as shown in FIG. 8B and FIG. 9B. This shift occurs due to the difference in the drop amount (see reference symbol "d" in FIG. 8A and FIG. 8B) of the cams 130 between the pre-assembly and post-assembly stages of the cam clutch unit 100. As a result, the spring 160 autonomously moves to the upper part S1b of the tapered groove space S1. The spring 160 therefore stops applying pressure on the cams towards the other axial side (right side in FIG. 8B), as a result of which the spring 160 comes out of contact with the cage ring 150. This in turn prevents generation of sliding resistance between the non-protruding surface 132 other than the engagement step 131 on one axial end face of the cams 130 and the spring 160 as well as sliding resistance between the other axial end face of the cams 130 and the cage ring 150.

While this embodiment employs twice as many cams 130 as rollers 140 so that one roller 140 and two cams 130 alternate, any numbers of cams 130 and rollers 140 may be used in any arrangement.

The cams 130 may have any shape, such as a sprag shape, for example.

Likewise, the hook portions 153 may be arranged in any way in accordance with the respective numbers and arrangements of the cams 130 and rollers 140. The hook portions 153 may have a uniform height in the radial direction, or may have different heights depending on their positions in the circumferential direction.

The taper surface 156 need only be provided to at least one of the plurality of circumferentially arranged hook portions 153.

The arrangement and height of the hook portions 153, with or without the taper surface 156 as the case may be, may be designed as suited in accordance with the respective numbers and arrangements of the cams 130 and rollers 140 to allow each cam 130 to move uniformly and precisely as described in the embodiment above.

Figure 10:
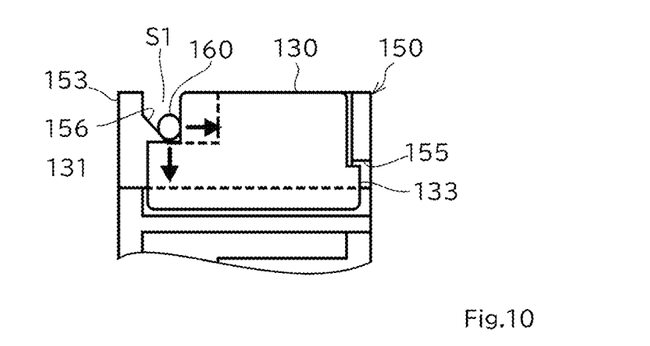
FIG. 10 is a partial cross-sectional view of a cam clutch unit according to another embodiment of the present invention.

FIG. 10 shows an alternative form of the cam clutch unit 100 according to the embodiment described above, in which the cams 130 include an axially protruding restriction step 133 on the end face opposite to the engagement step 131. The cage ring 150 includes, in each pocket portion 151, a restriction protrusion 155 on the surface that adjoins the restriction step 133 of the cam 130 in the axial direction, i.e., on the radially inner side of the support base 157, to restrict tilting of the cam 130. Therefore, when the spring 160 presses the cams towards the other axial side and radially inwards, the restriction steps 133 of the cams 130 engage with the restriction protrusions 155 of the cage ring 150, so that the cams 130 are reliably prevented from lifting or detaching from the cage ring 150.

Figure 11:
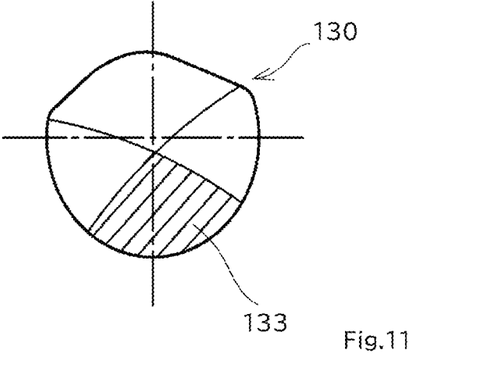
FIG. 11 is a bottom view illustrating the other axial end face of the cam in the cam clutch unit shown in FIG. 10.

The restriction step 133 on the cams 130 may be in any shape and at any location as long as it does not interfere with the cage ring 150 when the cams 130 rotate freely or wedge against the inner/outer race, for example in the area indicated with hatching in FIG. 11. Namely, the position of the restriction step 133 differs depending on the shape of the cage ring 150 and the stroke (amount of rotation) of the cams 130.

Embodiment 2

Figure 12:
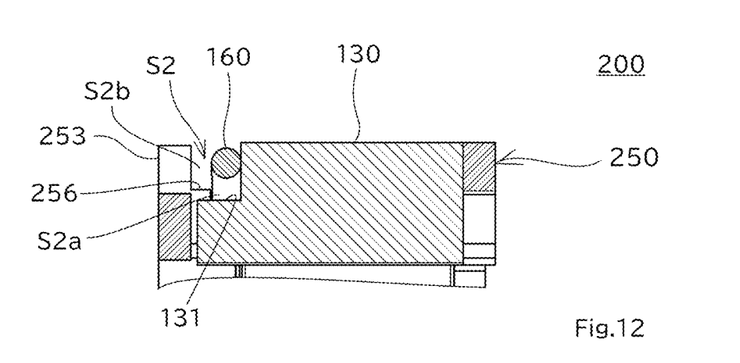
FIG. 12 is a partial cross-sectional view of a cam clutch unit according to yet another embodiment of the present invention.
Figure 13:
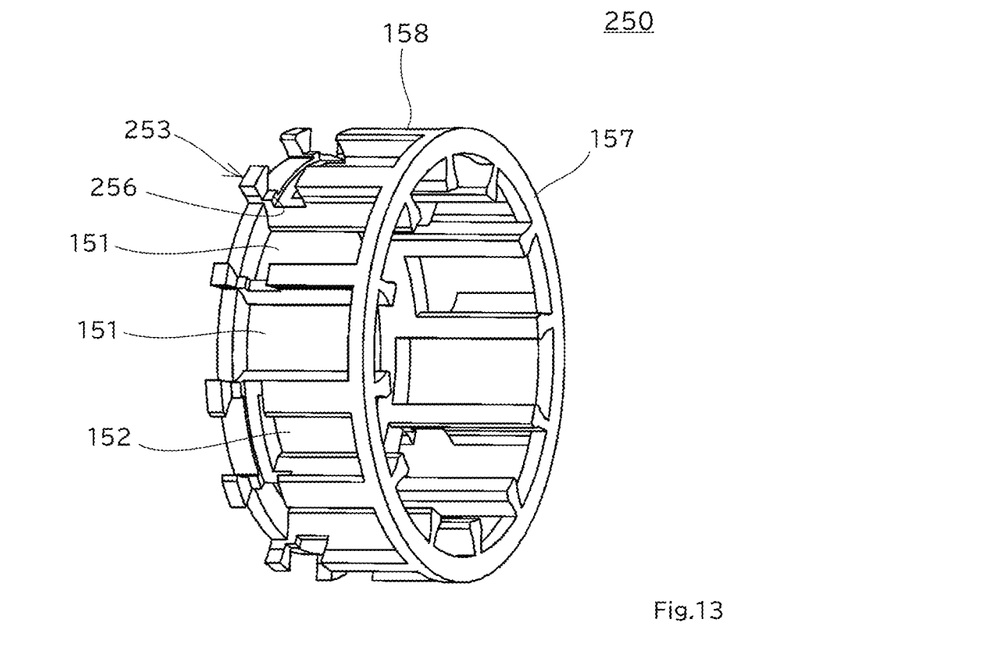
FIG. 13 is a perspective view of the cage ring in the cam clutch unit shown in FIG. 12.

The cam clutch unit 200 according to a second embodiment of the present invention is configured the same as the cam clutch unit 100 of the first embodiment described above except for the shape of the hook portions 153. In FIG. 12 and FIG. 13 that illustrate the second embodiment, the same elements as those of the cam clutch unit 100 according to the first embodiment are given the same reference numerals.

In the cam clutch unit 200 according to this embodiment, the hook portions 253 of the cage ring 250 have a step part 256 on the radially inner side (lower side in FIG. 12), which protrudes towards the cam 130 from one axial side to the other. The step parts 256 opposite the cams 130 function as a pressing part that allows the spring 160 to press the cams 130 towards the other axial side (right side in FIG. 12).

The step part 256 may be one step as shown in FIG. 12 or may have two or more steps.

The step part 256 need only be provided to at least one of the plurality of circumferentially arranged hook portions 253.

In the axial cross section of the cam clutch unit 200, imaginary lines of the step part 256 of a hook portion 253 overlapped with a cam 130 show that there is formed a stepped groove space S2 between them that reduces in axial width stepwise from one axial side (left side in FIG. 12) towards the other side (right side in FIG. 12). In the cam clutch unit 200 before assembly, the absence of the inner race and any component that restricts the rotation of the cams 130 about themselves causes the cams 130 to shift (drop) radially inwards, allowing the spring 160 to move independently into the bottom S2a of the stepped groove space S2 where the axial width is small. This movement causes the cams 130 to be pressed towards the other axial side (right side in FIG. 12), and the end faces of the cams 130 on the other axial side come into contact with the support base 157 of the cage ring 250. Once the cam clutch unit 200 is assembled into a cam clutch, the cams 130 undergo a radial outward shift to reach their intended position. This shift occurs due to the difference in the drop amount of the cams 130 between the pre-assembly and post-assembly stages of the cam clutch unit 200. As a result, the spring 160 autonomously moves to the upper part S2b of the stepped groove space S2. The spring 160 therefore stops applying pressure on the cams towards the other axial side (right side in FIG. 12), as a result of which the spring 160 comes out of contact with the cage ring 250. This in turn prevents generation of sliding resistance between the non-protruding surface 132 other than the engagement step 131 on one axial end face of the cams 130 and the spring 160 as well as sliding resistance between the other axial end face of the cams 130 and the cage ring 250.

Embodiment 3

Figure 14:
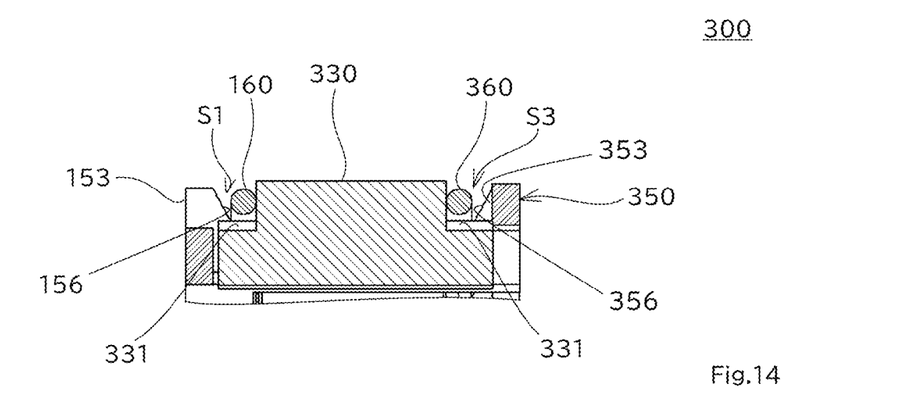
FIG. 14 is a partial cross-sectional view of a cam clutch unit according to a further embodiment of the present invention.
Figure 15:
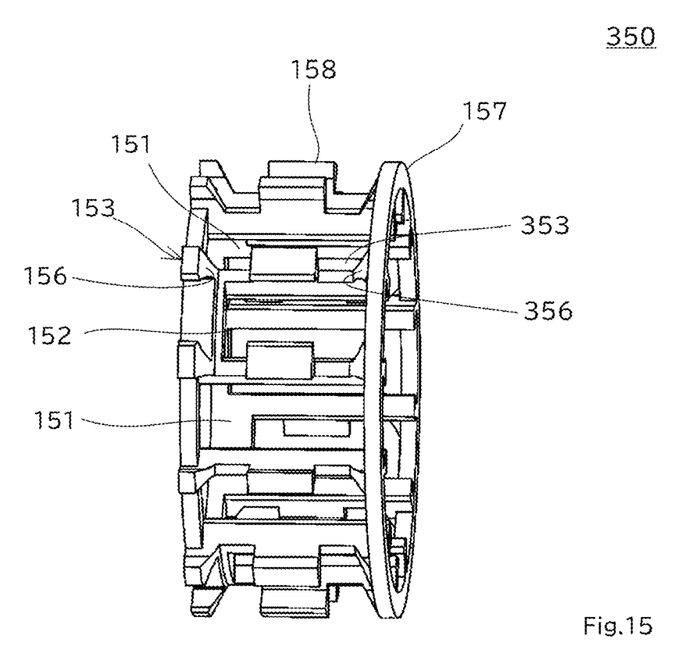
FIG. 15 is a perspective view of the cage ring in the cam clutch unit shown in FIG. 14.

In the cam clutch unit 300 according to the third embodiment of the present invention, as shown in FIG. 14 and FIG. 15, the cams 330 are formed with engagement steps 131 and 331 on both axial end faces. The partition walls 158 of the cage ring 350 have a recess 353 on the other axial side adjacent to the support base 157 so that there is a tapered groove space S3 also on the other axial side of the cage ring 350. The cams are biased by two annular springs 160 and 360. Other features are the same as those of the previously described first embodiment. In FIG. 14 and FIG. 15 that illustrate the third embodiment, the same elements as those of the cam clutch unit 100 according to the first embodiment are given the same reference numerals.

The recess 353 is formed with a taper surface 356 inclined towards the cam 330 side, i.e., from the radially outer side to the inner side and from the other axial side towards one axial side. The taper surfaces 356 opposite the cams 330 function as a pressing part that allows the spring 360 to press the cams 330 towards one axial side.

The tapered groove space S3 reduces in axial width from the other axial side (right side in FIG. 14) towards one side (left side in FIG. 14) from the annular support base 157.

Embodiment 4

Figure 16:
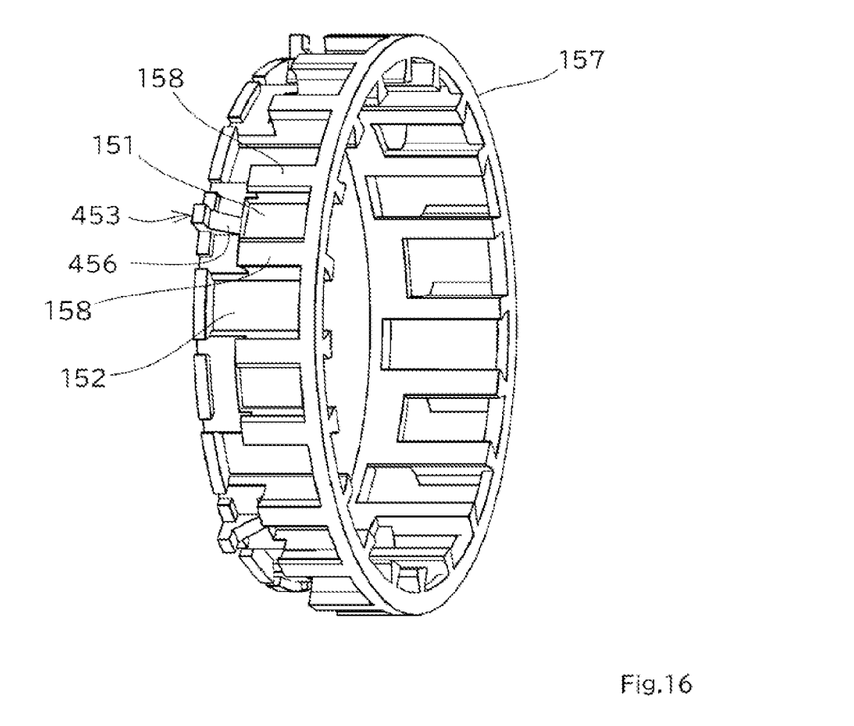
FIG. 16 is a perspective view of a cage ring in the cam clutch unit according to another embodiment of the present invention.
Figure 17:
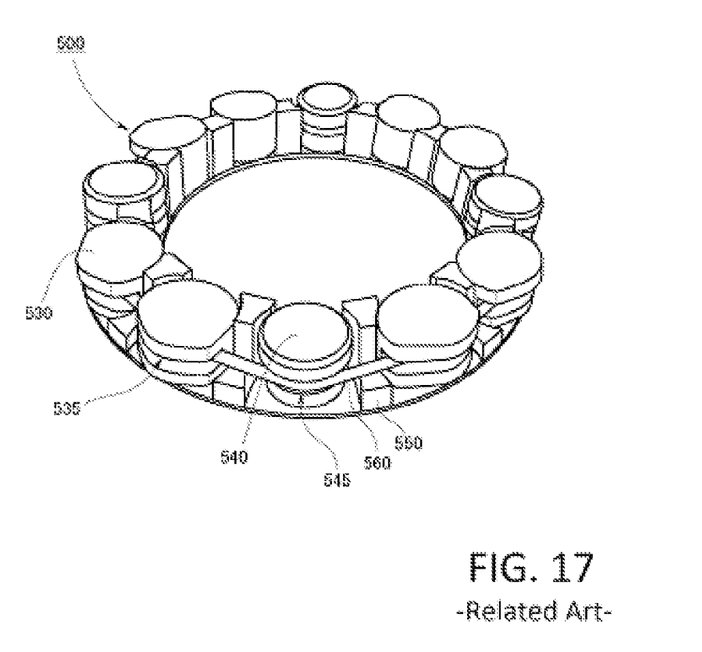
FIG. 17 is a perspective view of a conventional cam clutch unit.
Figure 18:
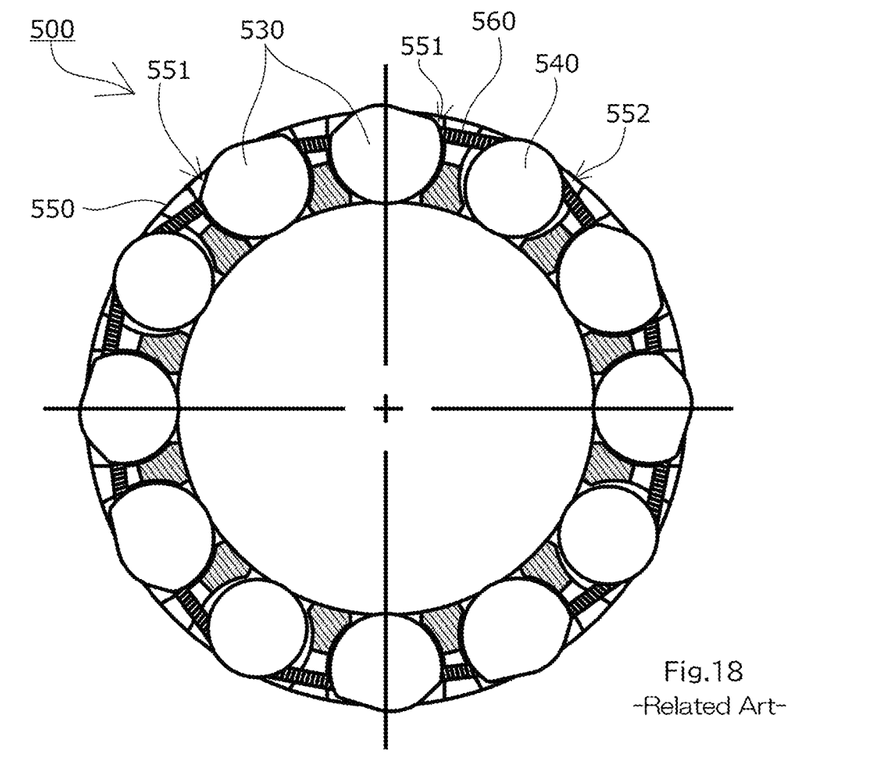
FIG. 18 is a front view of the cam clutch unit shown in FIG. 17 as viewed from the direction of the rotation axis.
Figure 19:
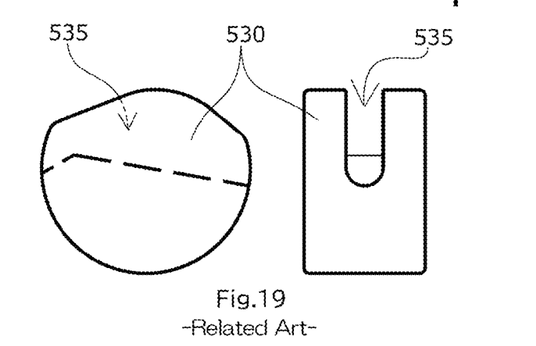
FIG. 19 is a front view and a side view of the cam in the cam clutch unit shown in FIG. 17.
Figure 20:
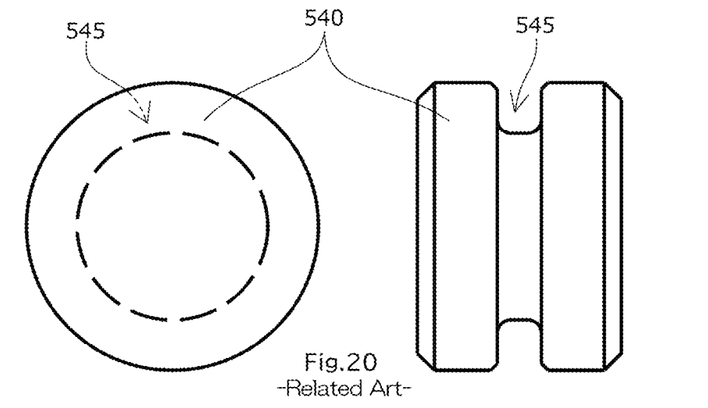
FIG. 20 is a front view and a side view of the roller in the cam clutch unit shown in FIG. 17.
Figure 21:
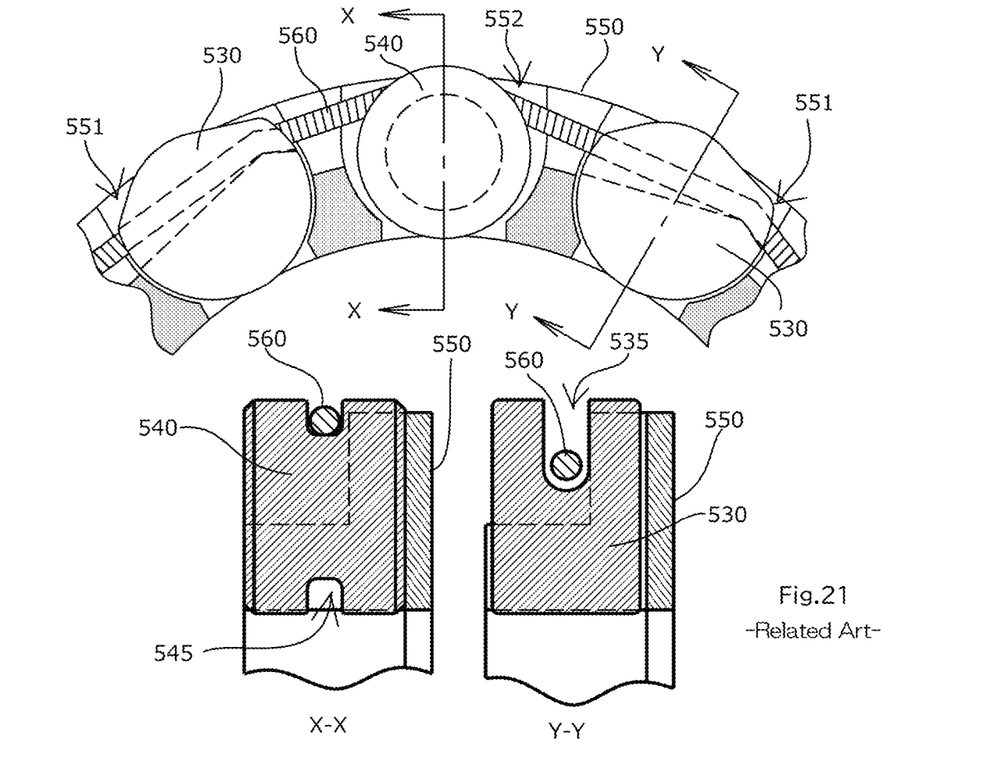
FIG. 21 is a partial front view and cross-sectional views of the cam clutch unit shown in FIG. 17.

The cam clutch unit according to a fourth embodiment of the present invention is configured the same as the cam clutch unit 100 of the first embodiment described above except for the positions of the hook portions. In FIG. 16 that illustrates the cage ring 450 of the cam clutch unit according to the fourth embodiment, the same elements as those of the cage ring 150 of the cam clutch unit 100 according to the first embodiment are given the same reference numerals.

The cage ring 450 of the cam clutch unit in this embodiment includes a plurality of hook portions 453 that restrict the axial movement of the annular spring 160 towards one axial side. The hook portions 453 are formed in the circumferential middle between two circumferentially adjacent partition walls 158 at one axial end (left end in FIG. 16) such as to protrude radially outwards. In the cage ring 450 of the cam clutch unit according to this embodiment, the pocket portions 151 that accommodate the cams 130 and the pocket portions 152 that accommodate the rollers 140 are circumferentially alternately arranged. The hook portions 453 are positioned at one axial end (left end in FIG. 16) in the circumferential center of the pocket portions 151 that accommodate the cams 130.

The hook portions 453 are formed with a taper surface 456 inclined towards the cam 130 side, i.e., from the radially outer side to the inner side and from one axial side towards the other. The taper surfaces 456 opposite the cams 130 function as a pressing part that allows the spring 160 to press the cams 130 towards the other axial side.

Between the taper surface 456 of each hook portion 453 and the cam 130 is formed a tapered groove space that reduces in axial width from one axial side towards the other side. This tapered groove space functions similarly to the tapered groove space S1 in the cam clutch unit 100 according to the first embodiment, so that the other axial end face of the cams 130 is pressed against the support base 157 of the cage ring 450 in the cam clutch unit before assembly. In the cam clutch after the cam clutch unit has been assembled, the tapered groove space prevents generation of sliding resistance between the non-protruding surface 132 other than the engagement step 131 on one axial end face of the cams 130 and the spring 160 as well as sliding resistance between the other axial end face of the cams 130 and the cage ring 450.

The taper surface 456 need only be provided to at least one of the plurality of circumferentially arranged hook portions 453.

While embodiments of the present invention have been described above in detail, the present invention is not limited to the embodiments above and may be carried out with various design changes without departing from the scope of the present invention set forth in the claims.

For example, in the embodiment described above in which the hook portions have a step part, the cams may further include an axially protruding restriction step on the end face opposite to the engagement step, and the cage ring may include restriction protrusions that restrict tilting of the cams on the surface axially adjacent to the restriction steps of the cams.

Alternatively, for example, the cams may be formed with engagement steps on both axial end faces so that there is a tapered groove space also on the other axial side of the cage ring, for the cams to be biased by two annular springs.

What is claimed is:

1. A cam clutch unit comprising:
   a plurality of cams arranged between an inner race and an outer race that are coaxial and rotatable relative to each other;
   a cage ring having a plurality of pocket portions that restrict relative circumferential movements of the cams; and
   an annular spring that biases the cams,
   the cams having an engagement step adapted to engage with the spring on one axial end face,
   the cage ring having a plurality of hook portions that restrict an axial movement of the annular spring,
   the hook portions having a pressing part that allows the spring to press the cams towards an other axial end.

2. The cam clutch unit according to claim 1, wherein the hook portions are formed with a taper surface inclined towards the cams from a radially outer side to a radially inner side, the taper surface serving as the pressing part on the radially inner side.

3. The cam clutch unit according to claim 1, wherein the hook portions have a step part protruding towards the cams on a radially inner side, the step part serving as the pressing part.

4. The cam clutch unit according to claim 1, wherein the cams have a restriction step on an end face opposite to the engagement step, and
   the pocket portions of the cage ring have a restriction protrusion that restricts tilting of the cams on a surface axially adjacent to the restriction step of the cams.

5. The cam clutch unit according to claim 1, further comprising a plurality of rollers arranged between the inner race and the outer race,
   the rollers having an axial length not greater than an axial length of the cams, excluding the engagement step.

* * * * *